United States Patent [19]

Cohen

[11] Patent Number: 5,112,917

[45] Date of Patent: May 12, 1992

[54] BLOCK COPOLYMER OF PERFLUOROETHER AND HYDROCARBON MONOMERS

[75] Inventor: Gordon M. Cohen, Wynnewood, Pa.

[73] Assignee: E. I. Du Pont de Nemours & Co., Wilmington, Del.

[21] Appl. No.: 395,387

[22] Filed: Aug. 18, 1989

[51] Int. Cl.$^5$ .................................................. C08F 8/00
[52] U.S. Cl. .................................... 525/185; 525/190; 525/326.8; 525/329.4; 525/330.3; 525/385; 525/386
[58] Field of Search ............... 525/185, 190, 326.8, 525/329.4, 330.3

[56] References Cited

U.S. PATENT DOCUMENTS

| | | | |
|---|---|---|---|
| 3,766,251 | 10/1973 | Caporiccio et al. | 260/486 |
| 3,810,875 | 5/1974 | Rice et al. | 260/899 |
| 3,882,193 | 5/1975 | Rice et al. | 260/874 |
| 4,440,918 | 4/1984 | Rice et al. | 526/246 |
| 4,655,807 | 4/1987 | Ohmori et al. | 55/522 |

FOREIGN PATENT DOCUMENTS 161804 11/1985 European Pat. Off.

Primary Examiner—Bernard Lipman

[57] ABSTRACT

This invention relates to a block copolymer containing one or more blocks of a perfluoroether polymer and one or more blocks of a polymer made from selected hydrocarbon monomers, the blocks being connected by connecting segments, each such segment including a group selected from:

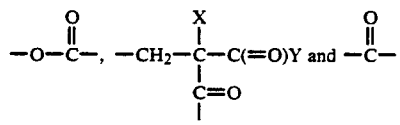

wherein X is hydrogen or methyl, and Y is dihydrocarbylamino and hydrocarbyloxy.

33 Claims, No Drawings

BLOCK COPOLYMER OF PERFLUOROETHER AND HYDROCARBON MONOMERS

BACKGROUND OF THE INVENTION

1. Field of the Invention

The invention relates to a block copolymer containing one or more blocks of a perfluoroether polymer and one or more blocks of a polymer made from selected vinyl monomers, the blocks being connected by specified groups. The copolymers of the present invention are useful for surface property modification.

2. Background Art

Y. Oshibe, et al., European Patent Application 0,161,804 disclose block copolymers of a fluorine containing vinyl monomer block and a fluorine free vinyl monomer block, using certain peroxy or azo group containing free radical initiators. No mention is made of perfluoroether polymer blocks.

Telechelic perfluoroether polymers containing polymerizable acrylic end groups are disclosed by D. E. Rice and J. V. Ihlenfeld in U.S. Pat. No. 4,440,918. When the acrylic end groups are polymerized, the perfluoroether polymer segments form crosslinks (branches) between acrylic polymer chains. Thus the perfluoroether polymer segments are not part of the "main" acrylic polymer chain formed by the reactive end groups.

There are several disclosures of polymers containing perfluoroether polymer side chains, made from polymerizable monomers containing these perfluoroether polymer groups. For example, G. Caporiccio and E. Strepparola in U.S. Pat. No. 3,766,251 disclose acrylic polymers containing side groups of poly(hexafluoropropylene oxide) and/or poly(tetrafluoroethylene oxide). The perfluoroether polymer segments are not part of the (acrylic) main polymer chain.

A similar disclosure is made by A. Ohmori, et al., U.S. pat. No. 4,655,807, where poly(hexafluoropropylene oxide) polymers are attached to acrylic polymers as a side chain through the acrylic ester linkage.

U.S. Pat. Nos. 3,810,875 and 3,882,193 describe block copolymers comprising at least one block derived from at least one free radical polymerizable terminally unsaturated monomer and at least one block comprising poly(perfluoroalkylene oxide). Although the connecting group between blocks is not stated, it is believed from the chemistry of the reactions used to make these block copolymers that the connecting linkage is a covalent bond.

SUMMARY OF THE INVENTION

This invention relates to a block copolymer comprising:
one or more blocks consisting essentially of polymers made from vinyl monomers selected from acrylic esters, acrylamides and maleimides and one or more blocks consisting essentially of a perfluoroether polymer,
wherein the blocks are connected by connecting segments, each such segment including a group selected from:

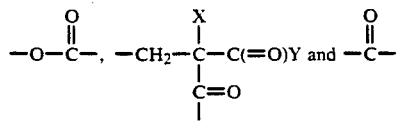

wherein X is hydrogen or methyl, and Y is dihydrocarbylamino or hydrocarbyloxy.

DETAILS OF THE INVENTION

The invention is a block copolymer comprising one or more blocks derived from vinyl monomers selected from acrylic esters, acrylamides and maleimides and one or more blocks or perfluoroether polymers, the blocks being connected by specified groups. By block copolymer is meant ". . . a polymer comprising molecules in which there is a linear arrangement of blocks. A block is defined as a portion of a polymer molecule in which the monomeric units have at least one constitutional or configurational feature absent from adjacent portions. In a block copolymer, the distinguishing feature is constitutional, i.e., each of the blocks comprises units derived from a characteristic species of monomer." (Quotation from H. Mark et al., Encyclopedia of Polymer Science and Engineering, John Wiley and Sons, New York, 1985, Vol. 2, pg. 324).

The blocks of the block copolymers of the instant invention are comprised of two different types of monomer units, perfluoroether monomer units and monomer units selected from acrylic esters, acrylamides and maleimides (herein referred to as vinyl monomers, and their polymers as vinyl polymers or blocks). Each of these monomer units is present in the main chain of the polymer. By acrylic esters are meant compounds of the formula

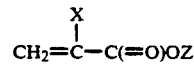

wherein X is methyl or hydrogen and Z is hydrocarbyl. By hydrocarbyl is meant a hydrocarbyl radical which may be substituted with functional groups that do not react with any of the starting materials or block copolymers or interfere with the reaction that forms the block copolymer. The functional group may be between two carbon chain segments, such as an ether group. Other examples of suitable functional groups are keto, ester and halo.

By acrylamides are meant compounds of the formula

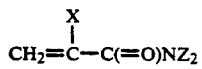

wherein X and Z are as defined above, and each Z is independently chosen. By maleimides are meant compounds of the formula

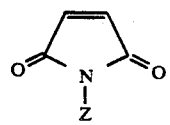

wherein Z is defined as above.

Preferred vinyl monomers are acrylic esters. In especially preferred acrylic esters, X is methyl. A most preferred monomer is methyl methacrylate.

The vinyl monomer derived blocks of this invention should have a Degree of Polymerization (DP, the average number of monomer units in a block) of at least 3 to about 400. Preferably these locks should have a DP of about 5 to about 400, and most preferably about 10 to 100. When

or

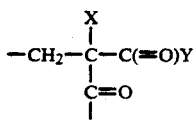

are the connecting groups, within the connecting segments, the DP range is about 5 to about 80, preferably about 10 to about 50. The vinyl polymer blocks may themselves be random or block copolymers of the vinyl monomers.

The perfluoroether polymer blocks of the instant invention are formed from one or more monomeric units of the formula

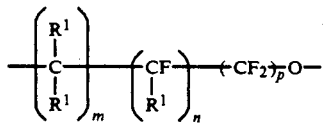

wherein m+n+p is 2, 3 or 4; and each $R^1$ is an independently selected perfluoroalkyl group containing one to twenty carbon atoms. It is understood that the groups $—C(R_1)_2—$, $—CFR_1—$ and $—CF_2—$ are not in any particular order in the monomeric unit, and if more than one of any group is present, it need not be adjacent to another. In one preferred monomer unit m and n are zero and p is two. [The polymer is usually called poly(tetrafluoroethylene oxide)]. In another preferred monomer unit m is zero n and p are one and $R_1$ is trifluoromethyl [the polymer is usually called poly(hexafluoropropylene oxide)]. The perfluoroether polymer block has a DP of 3 to about 100, preferably 3 to about 50, and most preferably 3 to about 30.

A preferred method of making the perfluoroether polymer, blocks of instant invention is to prepare the blocks before attachment to the vinyl polymer blocks. Such blocks should have one or two reactive end groups that react with end groups on the complementary block to which they are to be joined. Methods of making blocks of perfluoroether polymers with acid fluoride end groups on one or both ends are described in U.S. Pat. Nos. 3,250,807 and 3,347,901, which are hereby incorporated by reference. An especially useful reference for making poly(hexafluoropropylene oxide) blocks is J. T. Hill, Journal of Macromolecular Science, Chemistry, Volume A8, pp. 499–520 (1974).

Polymer blocks of vinyl monomers containing one or two functional end groups can be made by Group Transfer Polymerization (GTP). The preparation of such polymers is described in U.S. Pat. Nos. 4,414,372; 4,417,034; 4,508,880; 4,524,196; 4,581,428; 4,588,795; 4,598,161; 4,605,716; 4,622,372; 4,656,233; 4,659,782; 4,659,783; and 4,681,918; 4,732,955; 4,783,500; and 4,806,605, all of which are hereby included by reference.

A technique for connecting polymers derived from vinyl monomers and perfluoroether polymers is to react the acid fluoride end groups of the perfluoroether polymers with the living end group, generated in a GTP process. The reaction of silyl ketene acetals (one type of living end) with acid fluorides is described in commonly assigned U.S, patent application 07/336,120, filed Apr. 11, 1989, now U.S. Pat. No. 4,983,679 which is hereby included by reference. Such a reaction yields a connect-

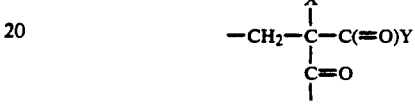

wherein X is as defined above and Y is —OZ or $NZ_2$, wherein Z is a s defined above. In this connecting group, the vinyl polymer block is connected to the free bond of the $CH_2$ group, and the perfluoroether polymer block is connected to the free bond of the (lower) carbonyl group.

If the end monomer group of the vinyl block made by GTP is a maleimide, the connecting group will be —C(=O)—.

The reaction of silyl ethers with acid fluorides is described in U.S. patent application 135,398, filed Dec. 21, 1987, now U.S. Pat. No. 4,845,156 which is hereby incorporated by reference. Such silyl ethers are end groups when selected initiators containing such groups are used in GTP. These end groups, when reacted with the acid fluoride end groups yield connecting groups of the formula —O—C(=O)—, wherein the vinyl polymer block is connected to the ester oxygen and the perfluoroether polymer block is connected to the carbonyl carbon atom.

It is understood for all of these connecting groups that in addition to the connecting group there may be parts of the end group of the previously formed block still present in the block copolymers, but that the connecting groups described above will always be present. For example, in Example 1, the complete connection between the blocks is

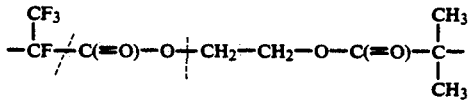

wherein the ester group between the dotted lines is the "essential" connecting group.

It is understood that the number and sequence of the blocks in the final block copolymer molecule is controlled by the number of reactive end groups (1 or 2) on each block. Thus if the precursor vinyl polymer blocks and perfluoroether polymer blocks have one reactive end group each, an AB block polymer will be produced (in this discussion an A block is derived from vinyl monomer and a B block from perfluoroether monomer).

If the precursor A block has two reactive end groups and the precursor B block has one reactive end group a BAB (assuming a 2:1 mole ratio of B to A blocks is present) block copolymer will be formed. If both the precursor A and B blocks have 2 reactive end groups, an $(AB)_r$ block copolymer will be formed, where r is an integer. Other combinations will be obvious to those skilled in the art.

The block copolymers of the present invention can be used as surface active modifiers for solutions of hydrocarbon or fluorocarbon polymers. These properties are illustrated in Examples 1-3 and in Comparative Examples 1 and 2. Due to their compatability with hydrocarbon and fluorocarbon polymers, they can serve as compatabilizers for blends of such polymers. They can be used to change the surface properties of polymers that are predominantly hydrocarbon or fluorocarbon in nature. Fluorocarbon surface modification makes hydrocarbon polymers more resistant to surface oxidation, hydrolysis and (non-fluorinated) solvent attack, and can increase lubricity U.S. Pat. No. 4,440,918 (p. 9, lines 35-46) shows it can be desirable to modify poly(perfluoroether) segments with hydrophilic moieties to improve the wettability of ophthalmic devices for comfort and visual acuity. Similar surface effects have previously been noted in European Patent Application 0,161,804 for block copolymers containing fluorine-free and fluorocarbon blocks.

In a preferred embodiment of this invention only a small proportion of a vinyl monomer derived polymer can be reacted with a perfluoroether polymer block, such that its surface is modified or it is made more compatible with a fluorocarbon polymer. The reverse of this is also true, that is a small proportion of perfluoroether polymer is reacted to form a block copolymer, thereby changing the surface properties of the perfluoroether polymer or making it more compatible with a hydrocarbon polymer.

In the following examples all glassware, including syringes, and syringe needles were dried in a 165° C. oven overnight prior to use. Rubber septa, "Teflon" parts, and other polymeric materials were dried overnight in a vacuum oven at 65° C., with a slight nitrogen purge. Argon was purified by passage through a reduced Girdler G-33 nickel oxide catalyst trap from United Catalysts, Inc., for removal of oxygen, and a molecular sieves trap for drying.

Glassware was assembled while hot, flushed with argon with additional external heating, and then maintained at 25° C. under a slightly positive pressure of argon. The joints of the glassware were connected without grease and wrapped with "Parafilm M" laboratory film Serum caps, for syringe introduction of solvents and reagents, were secured onto openings in the glassware by tightly-wrapped nylon ties.

Methyl methacrylate (MMA, Aldrich Chemical Co.) was dried and freed of alcohol and inhibitor by passage through a column of anhydrous alumina, neutral grade (Woelm), exiting the column through a syringe needle into a serum-capped bottle kept under a slightly positive pressure of argon. Tetrahydrofuran (THF) was dried over sodium and distilled from sodium benzophenone ketyl immediately before use. Initiators were distilled in a 12-inch spinning band column. Dried solvents, initiators, and catalyst solutions were stored in "Aldrich" bottles in "Drierite"-packed desiccators. Tetrabutylammonium fluoride (1 M in THF), was used as received from Aldrich. Tetrabutylammonium biacetate was prepared by addition of a stoichiometric amount of acetic acid to a THF solution of tetrabutylammonium acetate (Fluka), causing the insoluble biacetate to precipitate. The biacetate was dissolved in dry THF only by concommitant addition of 6:1 (molar) (water: biacetate) water.

Molecular weights and polydispersities ($\overline{M}_w/\overline{M}_n$) were determined by gel permeation chromatography (GPC) using a Waters Associates GPC with a 590 pump, 401 R.I. detector and 4 Microstyrogel columns, 100,000, 10,000, 500, and 100. Theoretical molecular weight was calculated from (wt. monomer)/(mol. initiator)+(formula wt. initiator fragment)+(formula wt. of quenching agent fragment and fluoropolymer).

The following abbreviations are used in the examples.
Bu$_4$NOAc—tetrabutylammonium acetate
GPC—gel permeation chromatography
HFPO—hexafluoropropylene oxide (subscript number following indicates average degree of polymerization)
HOAc—acetic acid
MMA—methyl methacrylate
Mn—number average molecular weight
MTS—[(1-methoxy-2-methyl-1-propenyl)oxy] trimethylsilane
Mw—weight average molecular weight
MW—molecular weight
PMMA—poly(methyl methacrylate)
THF—tetrahydrofuran
TTEB—[2-methyl-1-[2-(trimethylsiloxy)-ethoxy]-1-propenyl)oxy]trimethylsilane

EXAMPLE 1

Poly(MMA-b-HFPO) by Coupling PMMA with Trimethylsiloxy End Group to (HFPO)$_{5.2}$ To a 250-mL, 4-neck r.b. flask, equipped with an argon inlet, thermocouple well, pressure-equalizing dropping funnel, serum cap, and magnetic stirring bar, were introduced (by syringe) dry THF (75 mL), TTEB (2.5 mL, 7.9 mmol), and 0.04 M Bu$_4$NOAc.HOAc.6-H$_2$O/THF (30 μl). MMA (25 mL) was introduced to the stirred solution from the dropping funnel over an 80-minute period, the flask temperature rising from 28° C. to a peak of 35° C. at the end of the feed.

The living ends were quenched 2 hr after completing the MMA feed by syringing in 0.86 mL of benzoyl fluoride (7.9 mmol, Aldrich, 99%) and 0.20 mL of 0.04 M biacetate (0.1 mol % vs TTEB), and then the solution was stirred for 30 min. Then, 3.4 ml of an HFPO polymer of average DP=5.2, (HFPO)$_{5.2}$, and containing one acid fluoride group per molecule (ca. 7.9 mmol), and 0.4 mL of 1 M Bu$_4$NF/THF (5.1 mol % vs TTEB, Aldrich) were syringed in, causing a 2° C. exotherm. Stirred 18 hr at 25° C., the cloudy, colorless mixture became clear and yellow.

The THF solution was shaken in a separatory funnel with 50 mL of "Fluorinert" FC-75 (perfluorinated cyclic ether from 3M Company). Separation was incomplete even after 4 hr. After 7.5 hr, a clear, colorless FC-75 bottom layer was drawn off from a clear, yellow THF top layer. The THF layer was shaken with another 50 mL of FC-75, the bottom layer removed after 16.5 hr.

FC-75 was removed under vacuum from the combined extracts with a rotary evaporator, first at 25° C. and then at 50° C. A liquid residue, labeled C, 3.64 g, was recovered.

THF was partially removed under vacuum from the top layer, but severe foaming in the rotary evaporator prevented concentration below 22 g. The foaming may be caused by the surfactant-like PMMA-HFPO block copolymer. The concentrate was diluted with 28 mL THF and dripped slowly into 1000 mL of "Freon" TF (Du Pont, $CF_2Cl$-$CFCl_2$) precipitant. The precipitate, labeled A, isolated by vacuum filtration and dried on the filter and then the high vacuum antechamber of a dry box, weighed 15.2 g.

The TF/THF filtrate was concentrated at RT in an evaporating dish because foaming precluded use of a vacuum, and the wet solid, labeled B, was dissolved in a little THF and reprecipitated in excess hexane, stirred in a beaker. Filtered and dried as was A, B weighed 11.0 g.

Elemental analysis showed that C was mainly uncoupled HFPO polymer, A was PMMA containing a little HFPO polymer, and B was PMMA enriched with (mainly coupled) HFPO polymer Samples AP and BP were prepared by redissolving 1 g each of A and B and reprecipitating in 20-fold hexane, filtering, and drying. BR was prepared by with 20-mL portions of FC-75, precipitating from THF, extracting twice solution in 200 mL hexane, filtering and drying.

|  | % C | % H | % F |
| --- | --- | --- | --- |
| Theory for (MMA)$_{30}$ | 59.8 | 8.1 | 0 |
| A | 58.0,57.9 | 7.0,7.2 | 2.7,2.5 |
| AP | 59.0,59.3 | 8.1,8.0 | 1.5,1.5 |
| Theory for P(MMA-b-HFPO) | 51.7 | 6.3 | 14.6 |
| B | 54.2,54.4 | 6.9,6.7 | 12.0,11.8 |
| BP | 54.3,54.3 | 6.8,6.8 | 9.1,8.9 |
| BR | 54.4,54.3 | 7.0,7.0 | 7.5,7.6 |
| Theory for (HFPO)$_{5.2}$ | 21.7 | 0 | 68.7 |
| Measured (HFPO)$_{5.2}$ | 21.6,21.6 | 0.1,0.0 | 68.0,65.6 |
| C | 21.9,20.5 | 0.2,<0.1 | 70.9,71.3 |

Samples were spin-coated on thin, round glass plates (Thomas Scientific No. 2 cover glasses, red label, size 40 mm), from solutions of 0.5-g polymer in 1.25 mL toluene and 0.25 mL acetone. The contact angles of 5-$\mu$l droplets of deionized water on these coated plates were measured with a Ramé-Hart Model 100-00 contact angle goniometer. The numbers reported below are each the average of 10 measurements. The angles on B, BP, and BR are all higher than A, AP and a PMMA control, and are closer to polytetrafluoroethylene (PTFE). Because the contact angle on PTFE is higher than on the more hydrophilic surface of PMMA, the higher values on B, BP, and BR demonstrate that they have a higher surface fluorine content.

| Sample | PMMA ("Elvacite" 2010) | A | AP | B | BP | BR | PTFE (1.6 mm sheet) |
| --- | --- | --- | --- | --- | --- | --- | --- |
| Contact angle | 62° | 65° | 81° | 94° | 85° | 95° | 103° |

EXAMPLE 2

Poly(MMA-b-HFPO) by Coupling "Living" PMMA to (HFPO)$_{5.2}$

The procedure of Example 1 was repeated, with changes given below. MTS, (1.6 mL, 8.0 mmol) was used in place of TTEB, to eliminate —OSiMe$_3$ ends which might compete with the living ends for attaching HFPO polymer. The polymer was not quenched with benzoyl fluoride/biacetate, but treated instead with 3.4 mL of HFPO polymer (DP 5.2, 1 acid fluoride per molecule) (ca. 7.9 mmol) and 0.4 mL 1M Bu$_4$NF/THF 2.5 hr after completing the MMA feed, accompanied by a 1.2° C. exotherm. The mixture quickly yellowed and stayed cloudy after being stirred 19 hr at 25° C.

The mixture was extracted 4 times with 50-mL Portions of FC-75, the lower layers drawn off after successive waiting periods of 2.5, 1.5, 4, and 16 hr. In all but the last extraction, the yellow upper layer was either cloudy or contained an additional thin layer at the time the clear, colorless lower layer was removed. In the last extraction, both layers were allowed to become completely clear (complete separation).

Removal of FC-75 from the lower layers, with a rotary evaporator, left 1.46 g of a residue, labeled C. Complete removal of THF from the upper layer was again prevented by foaming, and a 48.1-g viscous, oily concentrate was obtained. It was diluted with 18 mL of THF, calculated to make a solution of about 2 mL THF per gram of the estimated 23 g of polymer. Precipitation in 920 mL of "Freon" TF gave only a small amount of fine solid which had to be packed tightly by centrifugation before it could be filtered out. 1.01 g was isolated. The TF/THF solution was concentrated to 31.2 g on a rotary evaporator and dissolved overnight in 93 mL of stirred 20:1 (v/v) "Freon" TF/THF. The solution was poured into 930 mL of "Freon" TF, and a precipitate, labeled A, was isolated by gravity filtration and dried to 3.95 g at 25° C. over a 6-day period. Another 1.45 g of A was recovered by extracting the solid left on the filter paper with THF and then removing THF with a rotary evaporator. The TF/THF filtrate was concentrated to 42.9 g and diluted with 28 mL THF to obtain approximately 40 mL of solvent for the estimated 20 g of polymer (assuming that most of the solvent in the concentrate was TF, with a density of about 2 g/mL). The solution was poured into a 20-fold volume of stirred hexane, giving 17.68 g of polymer B, isolated by filtration and dried 6 days at 25° C.

A 1.50-g sample of A was dried 24 hr to give 1.42 g of sample D in a 65° C. vacuum oven with slight nitrogen bleed, and 5.0 g of B similarly dried to 4.9 g of sample E. Portions of A and B were also redissolved and reprecipitated respectively to AP and BP as in the previous example. Also 3.7 g of B was dissolved in 40 mL of acetone, extracted with three 40-mL portions of FC-75, precipitated in hexane, filtered, and vacuum oven-dried, to give 3.0 g of sample BE and only 0.02 g of FC-75 extraction residue.

Elemental analysis, below, shows that B, E, BP, and BE are enriched in fluorine because they contain HFPO polymer and that A, D, and AP contain less fluorine. Higher water contact angles for the B series show the presence of more surface fluorine than for the A series. Both series have higher angles (more fluorine) than the PMMA control of the previous example.

| Sample | % C | % H | % F | Contact Angle (H$_2$O) |
| --- | --- | --- | --- | --- |
| A | 56.6,55.9 | 7.6,7.3 | 3.9,4.6 | — |
| D (dried A) | 56.6,57.0 | 7.6,7.5 | 4.1,3.7 | 76° |
| AP | 58.0,57.8 | 7.7,7.8 | 3.8,3.6 | 82° |
| B | 54.4,54.0 | 7.0,6.9 | 10.4,10.4 | 95°,82° |
| E (dried B) | 54.0,53.9 | 6.9,7.0 | 10.3,9.8 | — |
| BP | 54.0,53.8 | 7.0,7.2 | 10.7,10.5 | 100° |
| BE | 56.6,56.5 | 7.5,7.4 | 6.0,6.0 | 93°,86° |

-continued

| | GPC analysis gave the following: | | | |
|---|---|---|---|---|
| | $\overline{M}_n$ | $\overline{M}_w$ | $\overline{M}_p$ | $\overline{M}_w/\overline{M}_n$ |
| A | 3000 | 3000 | 3000 | 1.00 |
| B | 2300 | 2500 | 2600 | 1.09 |

Theoretical $\overline{M}_n$ for PMMA is 3000 and for PMMA coupled to HFPO pentamer about 3800. The $\overline{M}_n$ of B is reduced in part by the presence of about 5% of a negative peak in the GPC at MW=1000 and below, which may be uncoupled HFPO polymer or a low MW PMMA coupled to the poly HFPO. (HFPO)$_{5.2}$ has a refractive index which is on the opposite side of the solvent's from PMMA's.

EXAMPLE 3

Poly(MMA-b-HFPO) by Coupling "Living" PMMA with a Trimethylsiloxy End Group to (HFPO)$_{5.2}$ The procedure of Example 1 was repeated except for changes noted below. The TTEB-initiated polymerization was not quenched with benzoyl fluoride/biacetate but was treated instead, 4½ hr after completing the MMA feed, with 3.4 mL of HFPO polymer, DP 5.2, one acid fluoride per molecule, and 0.20 mL of 0.04 M biacetate. The temperature rose only 0.1° C. Ten min later, 2.0 mL of 0.04 M Bu$_4$NOAc/THF was added and the temperature rose another 0.1° C. The cloudy mixture did not clarify after it was stirred at 25° C. for 17 hr, and turned faintly green.

The mixture was placed in a separatory funnel and a small amount of liquid, labeled C, settled to the bottom and was removed. The remainder was shaken with 50 mL of FC-75 and a bottom layer removed after 1–2 hr, even though separation was incomplete. During the second extraction, with 30 mL of FC-75, separation was incomplete after 3 hr but improved after being left overnight. A clear, lower FC-75 layer was drawn off from a clear, upper THF layer and a 1/16"-thick milky middle layer.

The FC-75 extracts were combined with C, FC-75 removed by distillation through a Vigreux column at ambient pressure and gradually down to 2 mm, the bath temperature raised near the end from 25° C. up to 45° C. Residue C weighed 1.54 g. The 94.2 g of FC-75 distillate failed to show any traces of C in a GC analysis where 10% of C was very readily detected in spiked samples of distillate (10-μL samples were injected onto a 6'×1/8" stainless steel column packed with XE-60 (GE), 3% on 80/100 Chromosorb WHP at 145° C. with a He flow-rate of 25 mL/min and very low attenuation).

The THF top layer was concentrated almost to dryness with a rotary evaporator, accompanied by a lot of foaming. The 29.9 g residue was dissolved in 60 mL of THF and poured slowly into 1200 mL of stirred "Freon" TF precipitant. Precipitate, labeled D, was isolated by vacuum filtration, rinsed three times with 20:1 (v/v) "Freon" TF/THF, and dried at 25° C. on the funnel and then in an evaporating dish to a weight of 0.8 g. The filtrate was concentrated to a wet solid, dissolved in a minimum of CH$_2$Cl$_2$, and poured into a 20-fold volume of hexane. Precipitate, labeled E, was isolated by vacuum filtration and dried at 25° C. on the filter and then 2 days in an evaporating dish to a weight of 21.9 g.

A 2.0-g sample of E was dissolved in 10 mL THF, extracted three times with 10-mL portions of FC-75, and poured into a 20-fold volume of hexane. The filtered precipitate, ER, was dried at 25° C. more than a day and then left overnight in the high vacuum antechamber of a dry box.

Elemental analysis below, shows that C is mainly uncoupled HFPO polymer and both E and, to a lesser extent, D contain some HFPO polymer. Contact angle measurements, below, agree with the analyses, giving higher values (more fluorine) for E than D. MW data (by GPC) appears below.

| Sample | % C | % H | % F | Contact Angle (H$_2$O) |
|---|---|---|---|---|
| C | 23.0,22.9 | 0.5,0.4 | 68.5,65.8 | — |
| D | 54.6,54.1 | 7.1,7.4 | 2.2,2.2 | 70° |
| E | 58.2,57.3 | 8.1,7.5 | 5.2,5.1 | 101° |
| ER | 56.2,55.3 | 7.3,7.4 | 4.7 | 94° |

| GPC: | $\overline{M}_n$ | $\overline{M}_w$ | $\overline{M}_p$ | $\overline{M}_w/\overline{M}_n$ |
|---|---|---|---|---|
| C[a] | 440 | 540 | — | 1.23 |
| D[b] | 3600 | 4000 | 4000 | 1.11 |
| E[c] | 2900 | 3200 | 3300 | 1.11 |
| ER[b] | 3100 | 3500 | 3600 | 1.12 |

[a] All peaks negative. Theor. $\overline{M}_n$ for (HFPO)$_{5.2}$ = 858.
[b] No negative "shoulders".
[c] $\overline{M}_n$ possibly reduced by a negative "shoulder" on low MW side of main peak

COMPARATIVE EXAMPLE 1

Ease of Separation of FC-75 from THF with PMMA and (HFPO)$_{5.2}$

In 3.0 mL of THF, distilled from sodium-benzophenone, was dissolved 0.93 g of 3000-MW, benzoyl fluoride-capped PMMA with a trimethylsiloxy end group prepared by GTP. The solution was shaken with FC-75. Separation of the solvents was complete less than a minute after stopping the shaking.

To the mixture was added 0.14 g of (HFPO)$_{5.2}$. Separation into 2 clear layers was complete 45 sec after shaking. There was no milky interface. This easy separation illustrates the surface active nature of the block copolymer (see Examples 1, 2 and 3) compared to the separate polymers.

COMPARATIVE EXAMPLE 2

Failure to Couple (HFPO)$_{5.2}$ to PMMA Devoid of —OSiMe$_3$ End Group and Living Ends 3000-MW PMMA was prepared under argon in 75 mL of dry THF from 25 mL of dry MMA, 1.6 mL of MTS (8.0 mmol), and 30 μL of 0.04 M Bu$_4$NOAc.-HOAc.6H$_2$O/THF. Its living ends were quenched 2½ hr after completing the MMA feed with 0.86 mL of benzoyl fluoride (7.9 mmol) and 0.20 mL of 0.04 M biacetate. The solution was stirred for 30 min and a nitrogen line connected to the flask in place of the argon. The addition of 3.4 mL of (HFPO)$_{5.2}$ and 0.4 mL of 1 M Bu$_4$NF/THF created a 0.3° C. temperature rise. The flask was stirred at 25° C. for 18½ hr.

The mixture was extracted twice with 50-mL portions of FC-75. Separation into 2 layers was much faster than in Examples 1–3, within about 2 hr in the first extraction and 1.5 hr in the second. The FC-75 lower layer was concentrated on a rotary evaporator at 25° C. to 6.1 g and 50° C. to 5.8 g. After 18 hr in an evaporating dish at 25° C., it weighed 5.6 g, and after 3 days, 5.5 g (residue C).

The THF layer was concentrated to dryness on a rotary evaporator without the foaming problems exhibited in Examples 1-3. The solid was dissolved in THF (20 mL/g solid) and poured slowly into a 20-fold volume of stirred "Freon" TF. Precipitate A was isolated by vacuum filtration, rinsed, and dried on the funnel and then at 25° C. in an evaporating dish. After 5 days, A weighed 21.0 g and after 7 days, 20.8 g. The filtrate was concentrated and solid B obtained by precipitating in hexane, filtering, rinsing, and drying as for A. B weighed 4.4 g after 5 days at 25° C.

A 2.3-g portion of B was further dried to a weight of 1.6 g after 24 hr in a 65° C. vacuum oven with a slight nitrogen bleed. Portions of A and C were dried similarly. A 1.0-g portion of A was dissolved in THF, precipitated in 20-fold hexane, filtered, and dried at 25° C. and then 24 hr in a 65° C. vacuum oven, to give sample AP.

Elemental analyses below, show that C is largely uncoupled HFPO polymer, B is mainly PMMA free of HFPO (at least after it is oven-dried), and A contains some fluorine (in contrast with the A's in Examples 1-3) which is removed by reprecipitation probably because it is physically entrapped FC-75 or uncoupled HFPO polymer. Contact angle measurements (below) show that neither A nor B has appreciable surface fluorine. HFPO polymer has failed to couple.

This illustrates the differences in physical mixtures of the two polymers and the block copolymer. Polymers in this Example could not be block copolymers because the end groups needed to couple the blocks had been previously destroyed.

| Sample | % C | % H | % F | Contact Angle (H$_2$O) |
|---|---|---|---|---|
| C (oven-dried) | 20.6,20.5 | 0.7,0.6 | 53.7,53.4 | — |
| A | 52.5,51.7 | 5.9,6.3 | 6.1,5.9 | 60° |
| A (oven-dried) | 54.9,54.7 | 7.4,7.2 | 2.0,2.0 | — |
| AP | 59.0,59.0 | 8.1,8.0 | 0.1,0.1 | 65° |
| B | 67.2,66.9 | 10.2,10.3 | 0.4,0.4 | 69° |
| B (oven-dried) | 60.7,60.8 | 8.2,7.8 | 0.4,0.4 | — |
| GPC: | $\overline{M}_n$ | $\overline{M}_w$ | $\overline{M}_p$ | $\overline{M}_w/\overline{M}_n$ |
| A* | 3400 | 3700 | 3700 | 1.08 |
| B* | 2200 | 2400 | 2700 | 1.14 |
| B (oven-dried)* | 2000 | 2400 | 2600 | 1.19 |

*No Negative peaks seen, in contrast with Examples 1-3.

Although preferred embodiment of the invention have been described hereinabove, it is to be understood that there is no intent to limit the invention to the embodiments described and that variations can be made without departing from the spirit and scope of the invention as claimed.

What is claimed is:

1. A block copolymer comprising one or more blocks consisting essentially of polymers made from vinyl monomers selected from acrylic esters, acrylamides and maleimides and one or more blocks consisting essentially of a perfluoroether polymer, wherein the polymer blocks are connected by connecting segments, located between the blocks, each such segment including a group selected from:

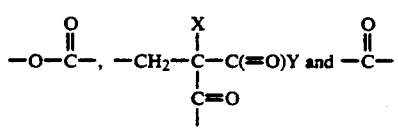

wherein X is hydrogen or methyl and Y is dihydrocarbylamino or hydrocarbloxy.

2. A block copolymer as described by claim 1 having one or more vinyl monomers said monomers being acrylic esters of the formula

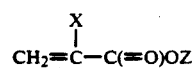

where X is methyl or hydrogen and Z is hydrocarbyl.

3. A polymer of claim 2 wherein X is methyl.

4. A block copolymer as described by claim 3 wherein the vinyl monomer is methyl methacrylate.

5. A block copolymer as described by claim 1 wherein such polymers made from vinyl monomers have a degree of polymerization of at least about 5 to about 400 provided that when each block is connected by a segment containing

or

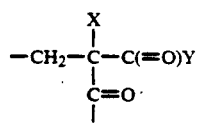

the degree of polymerization is about 5 to about 80.

6. A block copolymer as defined by claim 1 having one or more blocks of polymers made from vinyl monomers that are acrylamides of the structure

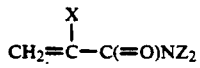

where X is methyl or hydrogen and each Z is an independently selected hydrocarbyl.

7. A block copolymer as defined by claim 1 having one or more blocks of polymers made from maleimides of the formula

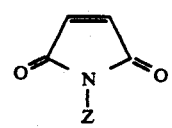

were Z is hydrocarbyl.

8. A block copolymer as described by claim 6 wherein the degree of polymerization of such polymer blocks made from vinyl monomers is at least about 5 monomer units to about 400, providing that when each block is connected by a segment containing the

or

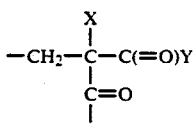

group, each block has a degree of polymerization of about 5 to about 80.

9. A block polymer as described by claim 8 wherein the degree of polymerization of such polymer blocks made from vinyl monomers is from about 10 to about 100, provided that when each block is connected by a segment containing the

or

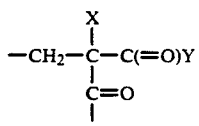

group, the degree of polymerization is about 10 to about 50.

10. A block copolymer as described by claim 1 wherein the perfluoroether polymer blocks are formed from one or more monomeric units, in random configuration, selected from monomers of the formula

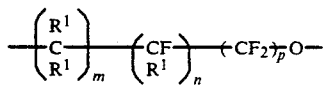

wherein $m+n+p=2$, 3 or 4
each $R^1$ is an independently selected perfluoroalkyl group containing one to twenty carbon atoms.

11. A block copolymer as described in claim 10 wherein the perfluoroether polymer blocks contain monomer units wherein the values of m and n are zero and p is two.

12. A block copolymer as described in claim 10 wherein the perfluoroether polymer blocks contain monomer units wherein the value of m is zero and n and p are 1 and $R^1$ is trifluoromethyl.

13. A block copolymer as described in claim 10 wherein the perfluoroether polymer blocks have a degree of polymerization of 3 to about 100.

14. A block copolymer as described in claim 13 wherein the perfluoroether polymer blocks have a degree of polymerization of 3 to about 30.

15. A block polymer as described by claim 1 wherein the vinyl monomer polymer blocks are random copolymers of the vinyl monomers.

16. A block copolymer as described in claim 10 wherein the vinyl monomers are acrylic esters of the formula

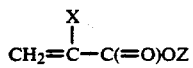

where X is methyl or hydrogen and Z is an independently selected hydrocarbyl.

17. A block copolymer as described in claim 16 wherein the vinyl monomer is methyl methacrylate.

18. A bock copolymer as described in claim 11 wherein the vinyl monomers are acrylic esters of the formula

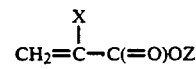

where X is methyl or hydrogen and Z is an independently selected hydrocarbyl.

19. A block copolymer as described in claim 18 wherein the vinyl monomer is methyl methacrylate.

20. A block copolymer as described in claim 12 wherein the vinyl monomers are acrylic esters of the formula

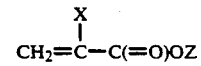

where X is methyl or hydrogen and Z is hydrocarbyl.

21. A block copolymer as described in claim 20 wherein the vinyl monomer is methyl methacrylate.

22. A block copolymer as described in claim 10 wherein the vinyl monomers are acrylamides of the formula

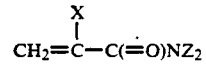

where X is methyl or hydrogen and Z is an independently selected hydrocarbyl.

23. A block copolymer as described in claim 10 wherein the vinyl monomers are maleimides of the formula

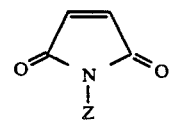

wherein Z is hydrocarbyl.

24. A block copolymer as described in claim 20 wherein the degree of polymerization of the acrylic ester block is about 10 to about 100, provided that when each block is connected by a segment containing the

or

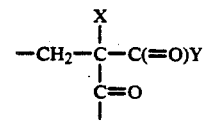

group, the degree of polymerization is about 10 to about 50, and the degree of polymerization of the perfluoroether polymer block is 3 to about 100.

25. A block polymer as described in claim 24 wherein the degree of polymerization of the perfluoroether polymer block is 3 to about 30.

26. A block copolymer as described in claim 22 wherein the degree of polymerization of the acrylamide block is about 10 to about 100, provided that when each block is connected by a segment containing the

or

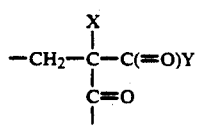

group, the degree of polymerization is about 10 to about 50, and the degree of polymerization of the perfluoroether polymer block is 3 to about 100.

27. A block copolymer as described in claim 26 wherein the degree of polymerization of the perfluoroether polymer block is 3 to about 30.

28. A block copolymer as described in claim 23 wherein the degree of polymerization of the maleimide block is about 10 to about 100, provided that when each block is connected by a segment containing the

or

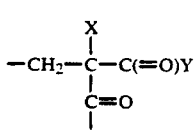

group, the degree of polymerization is about 10 to about 50, and the degree of polymerization of the perfluoroether polymer block is 3 to about 100.

29. A block copolymer as described in claim 28 wherein the degree of polymerization of the perfluoroether polymer block is 3 to about 30.

30. A block copolymer as described in claim 21 wherein the methyl methacrylate block has a degree of polymerization of about 10 to about 100, provided that when each block is connected by a segment containing the

or

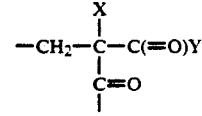

group, the degree of polymerization is about 10 to about 50, and the degree of polymerization of the perfluoroether polymer block is 3 to about 100.

31. A block copolymer as described in claim 30 wherein the perfluoroether polymer block has a degree of polymerization of 3 to about 30.

32. A block polymer as described by claim 1 wherein the connecting segment is

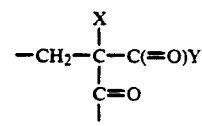

where X is CH$_3$ Y is OCH$_3$, having one or more vinyl monomers, said monomers being acrylic esters of the formula esters of formula

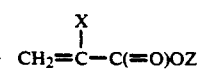

where X is CH$_3$ and Z is CH$_3$.

33. The block polymer of claim 32 wherein the perfluoroether polymer block are formed from one or more monomeric units, in randon configuration, selected from monomers of the formula

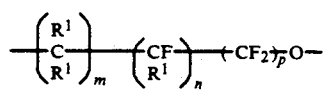

wherein m=0, p=1, n=1 R$^1$=CF$_3$.

* * * * *

UNITED STATES PATENT AND TRADEMARK OFFICE
CERTIFICATE OF CORRECTION

PATENT NO. : 5,112,917

DATED : May 12, 1992

INVENTOR(S) : Gordon M. Cohen

It is certified that error appears in the above-identified patent and that said Letters Patent is hereby corrected as shown below:

Column 4, line 17, "nect-" should read --necting group of the formula--

Column 7, lines 23-25, "filtering, and drying. BR was prepared by with 20-mL portions of FC-75, precipitating from THF, extracting twice solution in 200 mL hexane, filtering and drying." should read --filtering, and drying. BR was prepared by dissolving 2 g of B in 10 mL of THF, extracting twice with 20-mL portions of FC-75, precipitating from THF solution in 200 mL hexane, filtering and drying.--

Column 11, line 47, "Although preferred embodiment of the invention" should read --Although preferred embodiments of the invention--

UNITED STATES PATENT AND TRADEMARK OFFICE
CERTIFICATE OF CORRECTION

PATENT NO. : 5,112,917
DATED : May 12, 1992
INVENTOR(S) : Gordon M. Cohen

It is certified that error appears in the above-indentified patent and that said Letters Patent is hereby corrected as shown below:

Column 16, line 33, "where X is $CH_3$ Y is $OCH_3$, having one or more vinyl" should read --where X is $CH_3$, Y is $OCH_3$, having one or more vinyl--

Signed and Sealed this

Seventh Day of September, 1993

Attest:

BRUCE LEHMAN

*Attesting Officer*    *Commissioner of Patents and Trademarks*